United States Patent [19]
DeLeon et al.

[11] 3,903,346
[45] Sept. 2, 1975

[54] POLYISOCYANURATE STRUCTURAL LAMINATE AND PROCESS FOR PRODUCING SAME

[75] Inventors: Alberto DeLeon; Donald E. Hipchen, both of Clearwater; Michael J. Skowronski, Largo, all of Fla.

[73] Assignee: The Celotex Corporation, Tampa, Fla.

[22] Filed: Jan. 11, 1973

[21] Appl. No.: 322,782

[52] U.S. Cl. .................. 428/313; 156/79; 428/322; 428/425
[51] Int. Cl.² .................. B32B 3/26; B32B 5/18
[58] Field of Search ....... 161/161, 190, 160; 156/79

[56] References Cited
UNITED STATES PATENTS

| | | |
|---|---|---|
| 2,841,205 | 7/1958 | Bird .................................. 156/79 |
| 3,240,846 | 3/1966 | Voelker ........................ 161/190 UX |
| 3,496,058 | 2/1970 | Schroter et al. ..................... 161/160 |
| 3,533,901 | 10/1970 | Sutker.................................. 161/160 |
| 3,686,047 | 8/1972 | Miller ................................. 161/190 |
| 3,697,485 | 10/1972 | Rambosek et al. ................. 161/190 |
| 3,814,659 | 6/1974 | Nadeau............................... 161/161 |

*Primary Examiner*—William J. Van Balen
*Attorney, Agent, or Firm*—James W. Grace; David R. Murphy

[57] ABSTRACT

A process for producing a structural laminate having a polyisocyanurate foam core wherein a mixture of an organic polyisocyanate and diethylene glycol are applied to a facing sheet. The facing sheet comprises paper coated on both sides with a moisture vapor impermeable material. The coated facing sheet is then placed in an oven at 150° to 200° F, whereupon the mixture cures to a polyisocyanurate foam of uniform strength.

3 Claims, 3 Drawing Figures

PATENTED SEP 2 1975 3,903,346
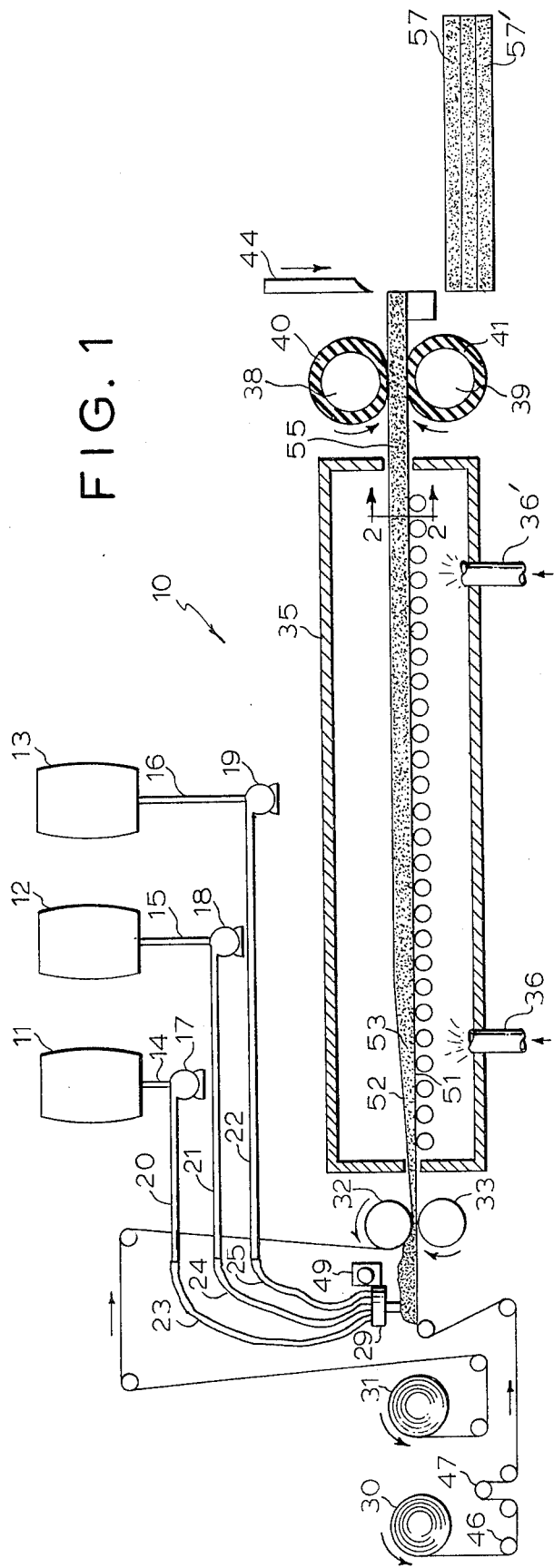
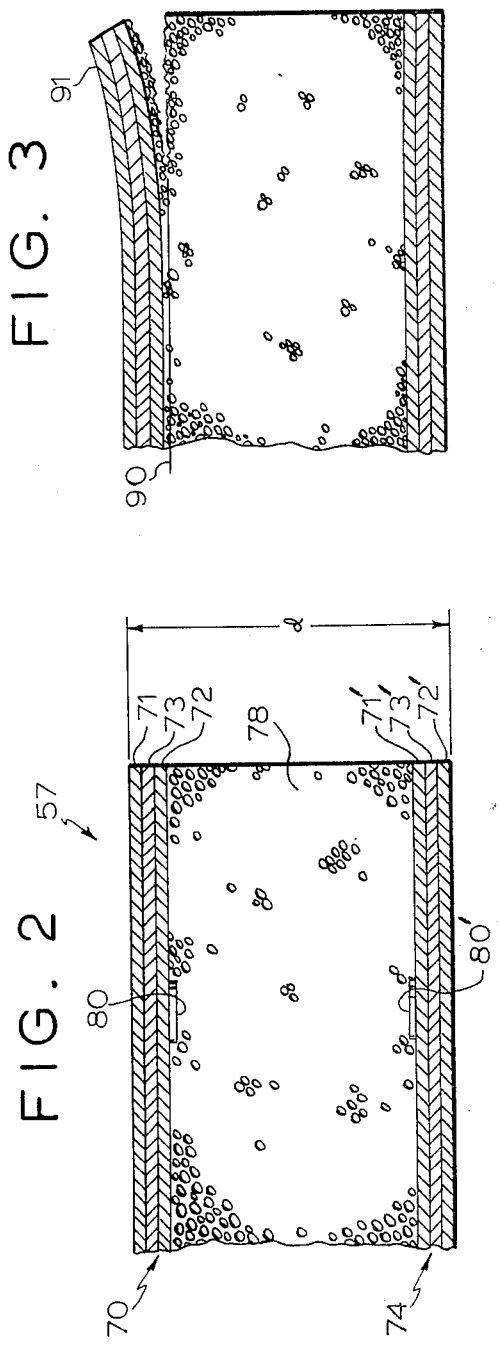

POLYISOCYANURATE STRUCTURAL LAMINATE AND PROCESS FOR PRODUCING SAME

Processes for producing structural laminates having facing sheets on one or both sides of a polyurethane core are well-known and are described, for example, in Bird U.S. Pat. No. 2,841,205; Coble U.S. Pat. No. 3,047,449, as well as in Volker U.S. Pat. Nos. 3,231,439 and 3,240,846.

Polyisocyanurate foams produced from certain organic polyisocyanates and certain low molecular weight diols are also known and are described for example in Haggis United Kingdom Pat. No. 1,155,768. Recently a number of attempts have been made to employ polyisocyanurate foams of the general type disclosed in Haggis in processes such as those described in the abovementioned patents but however employing a vapor impermeable facing sheet. These types of vapor impermeable facing sheets comprise a paper sheet coated on one or both sides with a moisture vapor impermeable material such as aluminum foil or polyethylene.

A great number of problems have been encountered. Perhaps the most troublesome problem is the lack of uniform strength in the polyisocyanurate core. This lack of uniform strength manifests itself in the form of a plane of weakness within the core but parallel to and adjacent to the vapor impermeable facing sheet. When the facing sheet is pulled, the core tends to rupture along this plane of weakness.

Another problem is poor interfacial adhesion between the facing sheet and the core. Yet another problem is blisters and surface imperfections on the facing sheet. Many attempts have been made to overcome these problems without adversely affecting the other physical properties of the structural laminate and/or the polyisocyanurate core. Examples of the other physical properties which are most often adversely affected are the flammability and friability of the polyisocyanurate core. While some of the solutions to the above problems do not affect the physical properties of the laminate or of the polyisocyanurate core, they do adversely affect processing parameters and most often adversely affect the cream time and/or the firm time of the polyisocyanurate forming materials.

Accordingly, it is an object of the present invention to provide an improved process for producing a polyisocyanurate structural laminate which is substantially free of the abovedescribed problems.

Another object is to provide an improved process wherein the polyisocyanurate core exhibits uniform strength and has no plane of weakness.

A further object is to provide an improved process which produces a laminate having good adhesion of the facing sheet to the core.

A still further object is to provide an improved process which produces a structural laminate devoid of blisters and other surface imperfections of the facing sheet.

Yet another object is to provide an improved process which solves the above problems without adversely affecting the physical characteristics of the laminate or of the core or without adversely affecting the cream time or firm time of the polyisocyanurate forming materials.

Still another object is to provide an improved structural laminate having a polyisocyanurate core.

Additional objects and advantages of the present invention will be apparent to those skilled in the art by reference to the following detailed description thereof.

According to the present invention, the above and other objects are accomplished by providing a process for producing a structural laminate comprising the steps of:

I. applying a mixture comprising an organic polyisocyanate and a diol to a vapor impermeable facing sheet. This vapor impermeable facing sheet having the mixture thereon is then immediately placed in an oven at 150° to 200° F, and preferably 160° to 190° F. While in the oven, the mixture cures to a polyisocyanurate foam of uniform strength. The vapor impermeable facing sheets employed in the present invention are those comprising a paper sheet coated on one or both sides with a moisture vapor impermeable material such as aluminum or polyethylene.

The invention may be better understood by reference to the drawings wherein:

FIG. 1 is a schematic representation of an apparatus suitable for practicing the process of the present invention;

FIG. 2 is an enlarged sectional view of a structural laminate taken along the line 2—2 of FIG. 1; and FIG. 3 is a view similar to that of FIG. 2 showing an undesirable property of structural laminates not produced in accordance with the present invention.

THE PROCESS

Referring now to the drawings and in particular to FIG. 1, there is shown schematically an apparatus 10 suitable for use in connection with the present invention. The apparatus 10 comprises an isocyanate tank 11, a polyol tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In operation, the isocyanate tank 11 is charged with the organic polyisocyanate admixed with the blowing agent, the polyol tank 12 is charged with the polyol admixed with the surfactant and the catalyst tank 13 is charged with the catalyst composition. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. The pull rolls 38, 39 each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible screw 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol and the isocyanate. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparrarent to those skilled in the art. For example, the tanks 11, 12, and 13 can be provided with refrigeration means in order to maintain the reactants at subambient temperatures.

Referring now to FIG. 2, there is shown a structural laminate in the form of the panel 57 comprising an upper facing sheet 70 and a lower facing sheet 74 on either side of a core 78. The upper facing sheet 70 comprises a first aluminum foil sheet 71 and a second aluminum foil sheet 72 on either side of a paper sheet 73. The lower facing sheet 74 is similarly constituted. The distance between the bottom and the top of the panel 57 is represented by the dimension $d$.

The core 78 is a polyisocyanurate foam generally having a compressive strength between 15 and 30 psi, and a friability less than 20 percent; a closed cell content of at least 85 percent and a thermal conductivity ($k$) of less than 0.12 BTU/(hr.) (sq.ft.) (°F/ft.)

THE ORGANIC POLYISOCYANATE

In the broadest aspect of the present invention, any organic polyisocyanate can be employed. The preferred organic polyisocyanate is polymethylene polyphenylisocyanate having the indicated functionality and indicated equivalent weight. Those polymethylene polyphenylisocyanates having a functionality of less than 2.1 are generally not acceptable because the resultant foams exhibit an undesirably high friability. Polymethylene polyphenylisocyanates having a functionality greater than 3.2 also produce foams of too great a friability. Therefore, the polymethylene polyphenylisocyanates of the present invention generally have a functionality of 2.1 to 3.2 and preferably 2.5 to 3.2.

Polymethylene polyphenylisocyanates having an equivalent weight less than 120 tend to produce foams having too great a friability. Those having an equivalent weight greater than 180 are generally too viscous to make their use practical. Therefore, the polymethylene polyphenylisocyanates employed in the present invention generally have an equivalent weight between 120 and 180 and preferably have an equivalent weight between 130 and 145. The friability is generally less than 30 percent, preferably less than 20 percent.

A preferred subclass of polymethylene polyphenylisocyanates especially useful in the present invention are a mixture of those of Formula I:

(I) 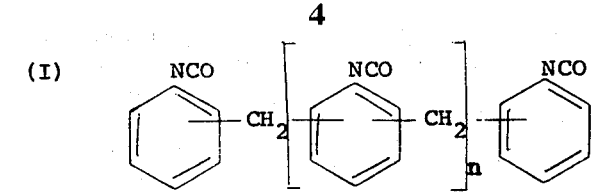

Wherein $n$ is an integer from 0 to 8 and wherein the mixture has the above-described functionality and equivalent weight. This mixture should have a viscosity between 100 and 4,000 and preferably 250 and 2500 centipoises measured at 25°C. in order to be practical for use in the present invention.

Examples of suitable polymethylene polyphenylisocyanates useful in the present invention include those of Formula I, wherein $n$ is 1 as well as mixtures wherein $n$ can have any value from 0 to 8 as long as the mixture has the specified equivalent weight. One such mixture has 40 weight percent of $n = 0$, 22 weight percent of $n = 1$, 12 weight percent of $n = 2$, and 26 weight percent of $n = 3$ to about 8. The preferred polymethylene polyphenyl isocyanates are described in U.S. application Ser. No. 322,843, filed Jan. 11, 1973. The synthesis of polymethylene polyphenylisocyanates is described in Seeger et al U.S. Pat. No. 2,683,730 and in Powers U.S. Pat. No. 3,526,652 at Column 3, Lines 6–21. It should, therefore, be understood that the polymethylene polyphenylisocyanate available on the market under the tradenames PAPI20(UPJohn) and E-418(Mobay) can successfully be employed within the spirit and scope of the present invention.

The ratios of diethylene glycol to isocyanate are critical to the present invention. The equivalent ratio of isocyanate to diethylene glycol is generally between 2:1 and 6:1 and is preferably between 3:1 and 5:1. The optimum ratio is 4.6:1. At higher ratios the core exhibits the abovedescribed undesirable plane of weakness and is too friable. At lower ratios the flammability is adversely affected.

THE DIOL

In the broadest aspects of the present invention, any diol having a low equivalent weight generally between 30 and 100, and preferably between 30 and 70, and having two hydroxyl groups which pass the Zerewitinoff Test, can be employed in the present invention. Triols and higher polyols can be admixed with these diols in minor amounts generally less than 10 percent provided the equivalent weight of the mixture is within the specified range. The preferred diols are those of Formula II:

(II) 

wherein $R^1$ is selected from the group consisting of lower alkylene and lower alkoxyalkylene with at least two carbon atoms. Examples of suitable diols include, among others, ethylene glycol, 1,2-propanediol, 1,3 propanediol; 1,4-butanediol; diethylene glycol, dipropylene glycol, dimethylol dicyclopentadiene, 1,3-cyclohexanediol; and 1,4-cyclohexanediol. Diethylene glycol is preferred since it gives a core of minimum friability and optimum facer sheet adhesion.

In order to ensure complete reaction, the polymethylene polyphenylisocyanate and the diol are generally mixed in an equivalent ratio of 2:1 to 6:1 and preferably 3:1 to 5:1. In ranges outside these proportions the reaction yields a product having undesirable physical characteristics. At higher ratios the product has an undesirably high friability. At lower ratios the product has an undesirably high flammability.

CATALYSTS

Any catalysts known to catalyze the trimerization of isocyanates to form isocyanurates can be employed in the present invention as long as they give cream times of 15 to 30 seconds and firm times of 25 to 60 seconds. One preferred type of catalyst is a mixture of equivalent amounts of 2,4,6-tris(trimethylaminomethyl)-phenol and potassium-2-ethyl hexoate, the synthesis and use of which is described in U.S. application Ser. No. 322,842 filed Jan. 11, 1973. Another catalyst system is that employing an epoxide, an N-substituted aziridine, and a tertiary amine. The synthesis and use of such a catalyst is described in U.S. Application Ser. No. 251,279 filed May 8, 1972 now U.S. Pat. No. 3,799,896.

The catalysts in the present invention are employed in an amount necessary to give the desired cream times and firm times and generally comprise from 0.1 to 20, and preferably from 0.3 to 10, weight percent of the total composition.

MOISTURE VAPOR IMPERMEABLE SHEETS

The moisture impermeable sheets employed in the present invention comprise a paper sheet bonded on at least one and preferably on both sides to a vapor impermeable sheet. Two specific embodiments are kraft paper coated on each side with aluminum and kraft paper coated on each side with polyethylene. The vapor impermeable sheets useful in the present invention generally have a moisture vapor transmission of less than 1 perm measured according to the ASTM Test No. E-9653T.

THE BLOWING AGENT

Any blowing agent characteristically employed in similar prior art products can be employed in the composition of the present invention. In general, these blowing agents are liquids having a boiling point between minus 50° and plus 100°C and preferably between 0° and 50°C. Examples of suitable blowing agents include, among others, chlorinated and fluorinated hydrocarbons such as $CCl_2F$—$CClF_2$, $CCl_2F$—$CF_3$ and fluorotrichloromethane which is the preferred blowing agent. The blowing agents are employed in an amount sufficient to give the resultant foam the desired bulk density which is generally between 0.5 and 10, and preferably between 1 and 5 pounds per cubic foot. The blowing agent generally comprises from 1 to 30, and preferably comprises from 5 to 20, weight percent of the composition. When the blowing agent has a boiling point at or below ambient, it is maintained under pressure until mixed with the other components. Alternatively, it can be maintained at subambient temperatures until mixed with the other components. Difluorodichloromethane is the preferred blowing agent having a boiling point outside of the preferred range but within the broad range.

THE SURFACTANT

Successful results have been obtained with silicone/ethylene-oxide/propylene-oxide copolymers as surfactants. The surfactant molecules act as nucleating points from which bubbles can be initially formed and they further stabilize the bubbles after formation to allow preparation of foam. Among the many surface-active materials mentioned in the patent literature as cell-size control agents and stabilizers for urethane foams are alkoxy silanes, polysilylphosphonates, polydimethyl siloxane and polydimethylsiloxane-polyoxyalkylene block copolymers. For a more detailed explanation of the function of the surfactant in the manufacture of foamed polyurethane and polymethylene polyphenylisocyanate compounds, reference is made to an article entitled "How Silicone Surfactants Affect Polyurethane Foams" in *Modern Plastics*, January, 1967 edition, Pages 133ff, of which Robert J. Boudreau is the author.

Examples of surfactants useful in the present invention include, among others, polydimethylsiloxane-polyoxyalkylene block copolymers available from the Union Carbide Corporation and the tradenames "L-5420" and "L-5340" and from the Dow Corning Corporation under the tradename "DC-193."

The surfactant generally comprises from 0.05 to 4, and preferably comprises from 0.1 to 2, weight percent of the composition.

EXAMPLES

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

This example illustrates the practice of the process of the present invention employing facing sheets of paper coated on both sides with aluminum foil, having a vapor permeability of 0.1 perms.

A mixture of 100 parts of polyisocyanate, 18.8 part of blowing agent, and 2.16 part of surfactant is placed in the tank 11. The polymethylene polyphenyl isocyanate is that supplied by the Upjohn Chemical Company under the trademark "PAPI-20" having an equivalent weight of 140 and a functionality of 3.2.

Diethylene glycol is placed in the tank 12.

A catalyst composition comprising 0.84 parts of 2,4,-6-tris(dimethylaminomethyl)phenol, 1.75 parts of potassium-2-ethyl hexoate, and 7.41 parts of polyoxyethylene glycol of molecular weight 200 are place in the tank 13. The 2,4,6-tris(dimethylaminomethyl)-phenol is that supplied by the Rohm and Haas Company as DMP-30. The polyethylene glycol is that supplied by the Union Carbide Company under the tradename Carbowax 200.

Facing sheets are supplied to the apparatus in the form of rolls 30, 31. The facing sheet comprises kraft paper 0.005 inch thick having on each side thereof aluminum foil 0.0003 inch thick. The inner layer of the aluminum foil is supplied with a thin coating of shellac.

The rolls 38, 39 are started, as are the pumps 17, 18, 19, to deliver the contents of the tanks 11, 12, 13 to the mixing head 29 in a weight ratio of 100:10.0:3.04. This corresponds to an equivalent ratio of isocyanate to diethylene glycol of 4.6:1. The contents of the tank 11 are maintained at 65° F by mild refrigeration, whereas the contents of tanks 12 and 13 are at 65° to 75°F. The oven 35 is maintained at a temperature of 175°F.

The resultant product has the general appearance of FIG. 2 wherein $d$ is between 0.5 and 1.050 inches. When an attempt is made to remove the upper facing sheet 70, the core 78 exhibits excellent strength. The adhesion of the facing sheets 70, 74 to the core 78 is excellent. The friability of the core is less than 15percent.

EXAMPLE 2

This example illustrates the practice of the process of the present invention wherein the facing sheets are paper coated on both sides with polyethylene.

The procedure of Example 1 is repeated except that the rolls 30, 31 are those of kraft paper coated on both sides with polyethylene. This material is available from the Weyerhauser Company under the designation polycoated SBS, and has a vapor permeability of 0.12 perms.

Substantially similar results are achieved.

EXAMPLE 3

This comparative example is not illustrative of the present invention and illustrates the undesirable results obtained when the oven temperature is raised to 200° F.

The procedure of Example 2 is repeated except that the oven temperature is raised to 200° F. Temperature-sensitive disks 80, 80' indicate that the maximum temperatures reached during passage through the oven was respectively 179° and 218° F. Both the upper and lower facing sheets 70, 74 were blistered.

EXAMPLE 4

This comparative example illustrates the undesirable results attendant upon the use of ethylene glycol in place of diethylene glycol.

Example 1 is repeated except that the diethylene glycol is replaced by an equivalent weight of ethylene glycol. The polyisocyanurate foam core is friable and the adhesion of the core to the facing sheet is poor.

EXAMPLE 5

This comparative example illustrates the undesirable results achieved when the temperature of the oven is less than 150° C.

The procedure of Example 1 is repeated except that the temperature of the oven is maintained at 140° C. The resultant laminate exhibits a plane of weakness 90 and easily fractures when the facing sheet 91 is pulled, as shown in FIG. 3.

GLOSSARY

CREAM TIME- the time interval beginning with the addition of the catalyst and ending when the composition changes color from dark brown to cream colored. This color change is also accompanied by a simultaneous increase in volume. Unless otherwise indicated, the reactants are mixed at 15° C under ambient conditions of atmospheric pressure and room temperature (25°C).

EQUIVALENT WEIGHT- the molecular weight of the component divided by its functionality. For example, ethylene glycol has a molecular weight of 62.07 and has two hydroxyl groups or a functionality of 2. Therefore, the equivalent weight of ethylene glycol is 62.07/2 or approximately 31. The equivalent weight of the polymethylene polyphenylisocyanate is of course determined by dividing the average molecular weight by the average number of isocyanate groups present per molecule. These equivalent weights can also be determined empirically.

FIRM TIME- The time interval between catalyst addition and the firm point. Firm time is measured by periodically pressing by hand the top of the rising foam with a tongue depresser (a stick approximately 6 inches × ¾ inches × 1/16 inch). When the tongue depresser no longer penetrates the surface, the time is noted. The elasped time from addition of catalyst to this point is termed the firm time. At times prior to the firm point, the composition has the characteristics of a viscous liquid or gel, whereas after the firm point it can be cut and otherwise handled.

BURN EXTENT- this is measured in terms of burn extent in the Monsanto Tunnel, as described by M. M. Levy, *Journal of Cellular Plastics*, April 1967, and by H. L. Vandersall, *Journal of Paint Technology*, 39 494 (1967). Conventional non-flame-retardant urethanes burn in excess of 23 inches (length of tunnel), while moderately flame-retardant conventional foams burn 15–20 inches and highly flame-retardant conventional foams burn 10–15 inches in this tunnel.

FRIABILITY- the propensity of the foam to break expressed in percent weight loss. This is determined by the ASTM C-421 friability test conducted for 10 minutes.

THERMAL STABILITY- the ability of the foam to maintain its weight at elevated temperatures. A temperature of 300° C is used for all tests. Thermal stability is expressed as percent weight loss and is measured by thermogravimetric analysis according to the technique described by J. E. Sheridan et al in the *Journal of Cellular Plastics*, May–June 1971.

OXYGEN INDEX- this is the measure of the flammability. The higher the number, the less flammable is the product. This is measured according to ASTM D-2863-70 except that a sample measuring ½ inch × ½ inch × 6 inches is used. A reading of 24 or greater is desired.

Although the invention has been described in considerable detail with reference to certain preferred embodiments thereof, it will be understood that variations and modifications can be effected within the spirit and scope of the invention as described above and as defined in the appended claims.

What is claimed is:

1. A process for producing a structural laminate having a polyisocyanurate foam core and two vapor impermeable facing sheets, said process comprising:

I. applying a foam forming mixture consisting essentially of:

A. mixture of polymethylene polyphenyl isocyanates of Formula I,

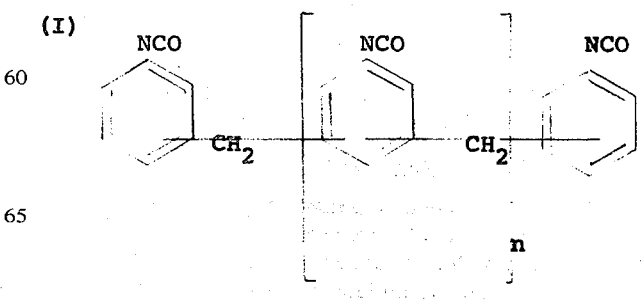

wherein $n$ is an integer from 0 to 8 and the polyisocyanates have an equivalent weight of 120 to 180 and a functionality of 2.3 to 3.0 and the mixture has a viscosity of 250 to 2500 centipoises measured at 25°C;

B. a diol of Formula II:

(II)   HO—R$^1$—OH wherein R$^1$ is selected from the group consisting of lower alkylene and lower alkoxyalkylene, wherein the equivalent ratio of A:B is between 2.9:1 and 3.5:1;
   C. a trimerization catalyst composition in an amount and of a type sufficient to give the foam forming mixture a cream time between 15 and 30 seconds and a firm between 25 and 60 seconds;
   D. fluorotrichloromethane in an amount from 5 to 20 weight percent based on the weight of the form foaming mixture;
   E. a surfactant in an amount from 0.1 to 2.0 weight percent based on the weight of the foam forming mixture; to the space between two facing sheets comprising kraft paper coated on both sides with aluminum foil, and immediately thereafter,
II. placing the facing sheets with the foam forming mixture therebetween in an oven at 160° to 190°F to cure the foam forming mixture to a rigid, fire-resistant foamed core of uniform strength having both facing sheets tenaceously adhering to opposite sides thereof.

2. The process of claim 1 wherein the diol consists essentially of diethylene glycol.

3. A structural laminate comprising:
A polyisocyanurate foam core comprising the reaction product of:
   A. a mixture of polymethylene polyphenyl isocyanates of Formula I:

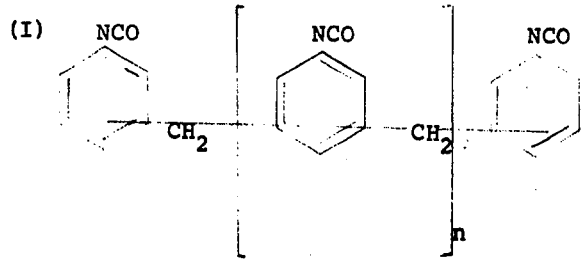

wherein $n$ is an integer from 0 to 8 and the polyisocyanates have an equivalent weight of 120 to 180 and a functionality of 2.3 to 3.0 and the mixture has a viscosity of 250 to 2500 centipoises measured at 25°C;

B., a diol of Formula II:

(II)   HO—R$^1$—OH wherein R$^1$ is selected from the group consisting of lower alkylene and lower alkoxyalkylene, wherein the equivalent ratio of A:B is between 2.9:1 and 3.5:1;
   C. a trimerization catalyst composition;
   D. fluorotrichloromethane in an amount from 5 to 20 weight percent based on the weight of the form foaming mixture;
   E. a surfactant in an amount from 0.1 to 2.0 weight percent based on the weight of the form foaming mixture; two facing sheets comprising kraft paper coated on both sides with aluminum foil, tenaceously adhering to opposite sides of the foam core, wherein the foam core exhibits no plane of weakness,
wherein the foam core has a density of 1 to 5 pounds per cubic foot,
wherein the foam core has a friability less than 20 percent.

* * * * *